April 29, 1941.    C. A. REIMSCHISSEL ET AL    2,239,735
THREAD CUTTING MECHANISM
Filed Jan. 4, 1939    5 Sheets-Sheet 1
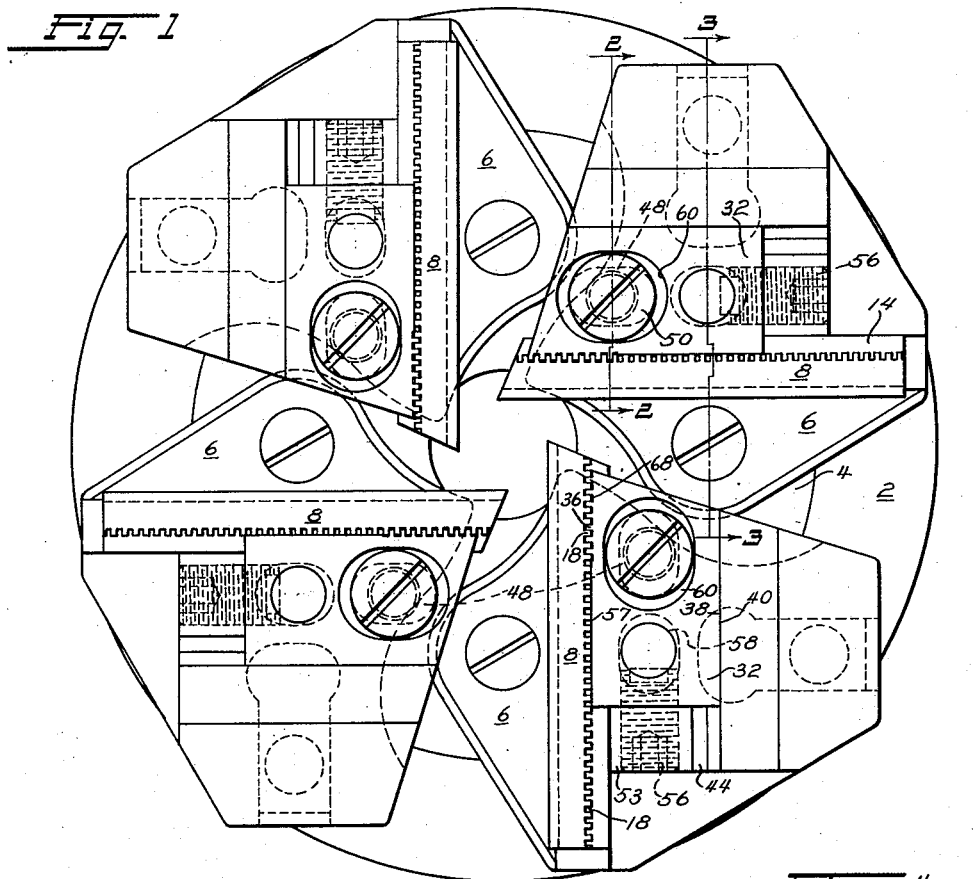
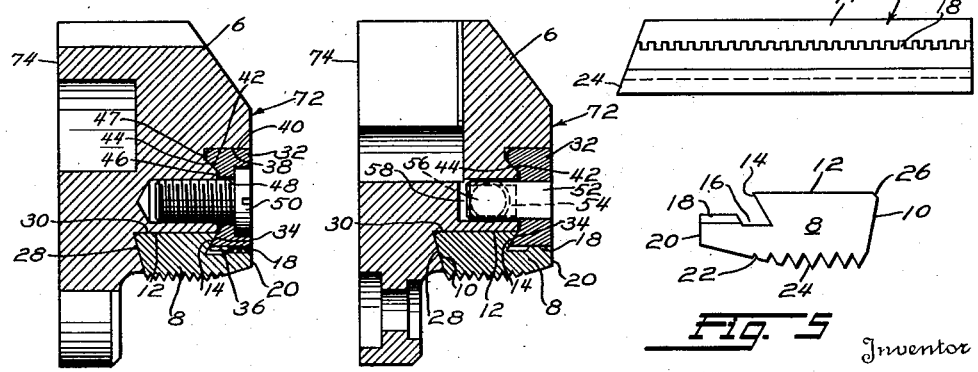
Inventor
Charles A. Reimschissel
Edwin M Eigenbrode
By Strauch & Hoffman
Attorneys

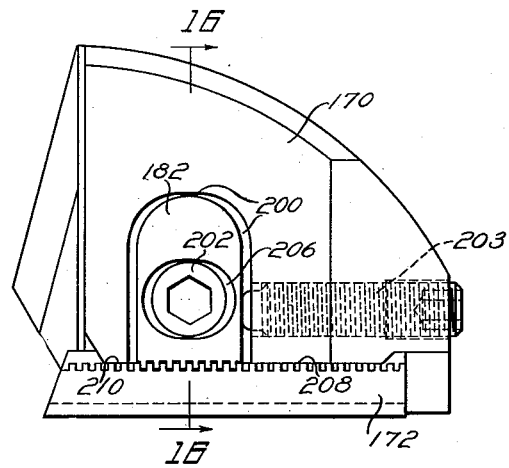
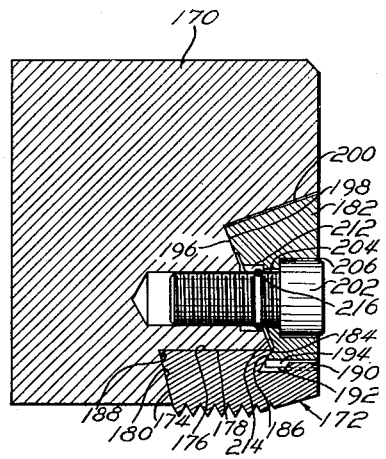
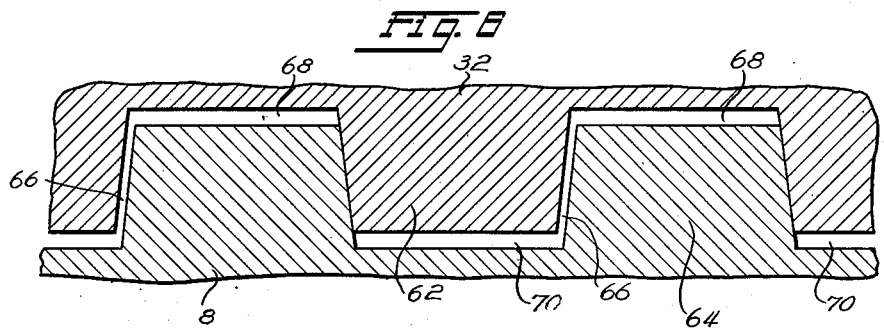
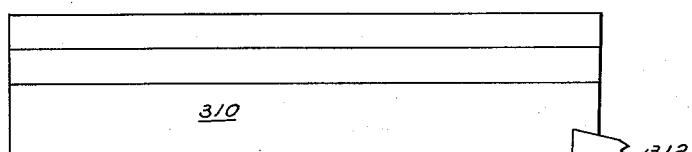
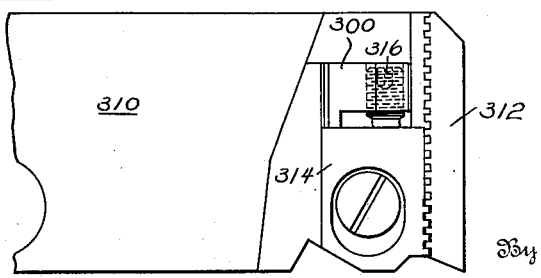
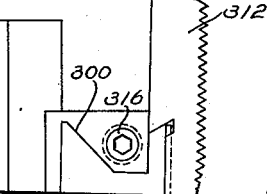
Inventor.
Charles A. Reimschissel
Edwin M. Eigenbrode April 29, 1941.  C. A. REIMSCHISSEL ET AL  2,239,735
THREAD CUTTING MECHANISM
Filed Jan. 4, 1939  5 Sheets-Sheet 3

Inventor
Charles A. Reimschissel
Edwin M. Eigenbrode

Strauch & Hoffman
Attorneys

April 29, 1941.  C. A. REIMSCHISSEL ET AL  2,239,735

THREAD CUTTING MECHANISM

Filed Jan. 4, 1939   5 Sheets-Sheet 4

Inventor
Charles A. Reimschissel
Edwin M. Eigenbrode
By Strauch & Hoffman
Attorneys April 29, 1941.  C. A. REIMSCHISSEL ET AL  2,239,735

THREAD CUTTING MECHANISM

Filed Jan. 4, 1939  5 Sheets-Sheet 5

Inventor
Charles A. Reimschissel
Edwin M. Eigenbrode

Strauch & Hoffman
Attorneys

Patented Apr. 29, 1941

2,239,735

UNITED STATES PATENT OFFICE 2,239,735

THREAD CUTTING MECHANISM

Charles A. Reimschissel and Edwin M. Eigenbrode, Waynesboro, Pa., assignors to Landis Machine Company, Waynesboro, Pa., a corporation of Pennsylvania Application January 4, 1939, Serial No. 249,325

32 Claims. (Cl. 10—104)

This invention relates to thread-cutting mechanisms and more particularly to chaser assemblies of the kind widely used in die heads of the general type shown in the four United States patents to Shearer, Nos. 1,760,567 and 1,760,568; and Reimschissel Patents Nos. 2,082,757 and 2,082,758. The chaser assemblies with which this invention is concerned are, in general like those known in the prior art, and are shown, for example, in the following United States Patents: Nos. 1,738,847, 1,951,290, 1,906,176 and Reissue No. 20,930.

As is well known to those skilled in the art, chaser assemblies of this kind comprise a holder, which is mounted in the die head mechanism so as to partake of radial or rotational movement, a chaser, and a clamp for holding the chaser firmly in the holder against the forces incident to thread-cutting, feeding and head control action of the chaser. As will readily be appreciated from the numerous kinds of chaser assemblies, a few of which are illustrated in the mentioned patents, a great deal of work has been done in this field. This is due to the fact that considerable difficulty has been experienced with the problem of providing the necessary rigidity of chaser mounting, which must be such that the equivalent of an integral one-piece cutter and control element is provided, while at the same time rendering adjustment of the chaser simple and easy to effect and also keeping the overall dimensions of the assembly within desired limits.

In addition to the foregoing, the conditions under which devices of this kind operate require that the assembly, which, due to the multiple function of the chaser, may be aptly referred to as a cutter-control element, be rugged and dependable in operation, not likely to get out of order even when abused by unskilled hands, and also entirely flexible so as to render it adaptable to various types of work-pieces.

The prior art devices, while in general fairly satisfactory, at best satisfy only certain of these conditions; and it is, accordingly, a primary object of our invention to provide novel and improved types of chasers and chaser assemblies wherein all of these desired conditions are realized.

More specifically, it is an object of our invention to provide a novel and improved chaser assembly wherein the chaser is adjustable through the medium of an adjusting means associated with the chaser clamp, thereby eliminating the undesirable contact of an adjustment screw on the hardened chaser and making it possible to protect the adjusting means from chips and dirt, and wherein the chaser and clamp are coupled together by cooperating and interfitting surfaces arranged so as to provide additional chaser support.

It is also an object of our invention to provide a novel and improved chaser assembly of the type described in the preceding paragraph wherein the adjusting and clamping means are arranged so as to permit the rapid change of chasers; and, at the same time, to accommodate chasers varying widely in length.

A still further object of our invention is to provide a novel and improved chaser assembly wherein the chaser and its clamp are interlocked through matching surface formations arranged on non-clamping surfaces and with definite clearances whereby the interlocking arrangement of the chaser and its clamp does not interfere with the clamping action.

It is also an object of our invention to provide an improved and novel chaser assembly wherein the chaser and its clamp are interlocked through matching surface formations and in which certain of the said surface formations on the chaser are arranged to form additional seating surfaces to give further support to the chaser.

Another object of our invention is to provide a novel and improved chaser and clamp assembly wherein the chaser and clamp are interlocked through matching surface formations arranged on non-clamping surfaces and further arranged to provide added seating surfaces.

A still further object of our invention is to provide a novel and improved chaser adapted for use in chaser assemblies of the present type and provided with surface formations on a non-clamping surface with said formations further shaped to present additional seating surfaces on said chaser.

Another object of our invention is to provide a novel chaser, of the type described in the foregoing paragraph, wherein the said surface formations are formed as arcuately bottomed grooves.

A still further object of our invention is to provide a novel and improved chaser assembly wherein the adjusting screw is operable to effect a micrometric adjustment of the chaser and also carries a positive locking means.

The foregoing and other ancillary objects will become apparent from a study of the following detailed description of preferred embodiments of our invention when considered with the appended claims and accompanying drawings, wherein:

Figure 1 is a face view of a die head provided with one form of our improved chaser assembly;

Figure 2 is a sectional view of one of the chaser assemblies of Figure 1, taken on the line 2—2;

Figure 3 is a view similar to that of Figure 2, but taken on line 3—3 of Figure 1;

Figure 4 is a side elevation of a chaser similar to that used in the assembly of Figure 1;

Figure 5 is an end elevation of the chaser shown in Figure 4;

Figure 6 is an enlarged view of the chaser and chaser clamp serrations showing the preferred cross-sectional shape thereof and also the crest and side clearances;

Figure 7:
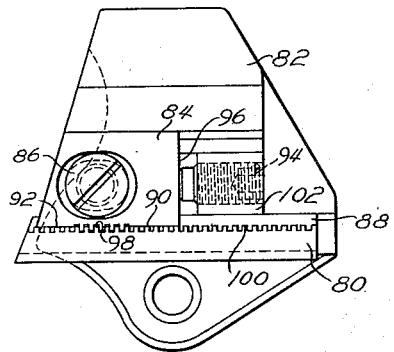
Figure 7 is a plan view of a modified type of chaser assembly embodying another form of our invention.
Figure 8:
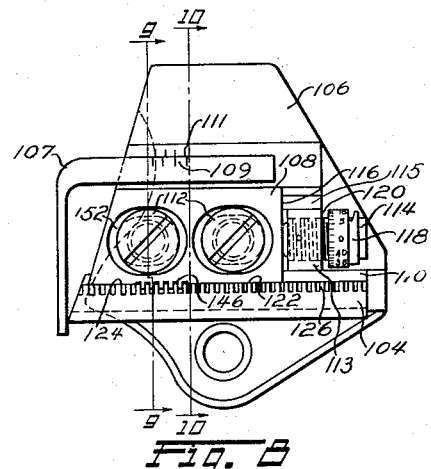
Figure 8 is a plan view of another modified type of chaser assembly.
Figure 9:
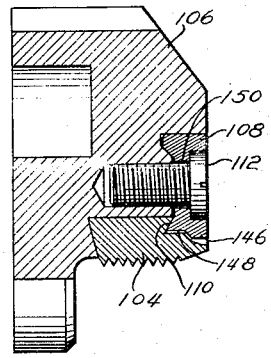
Figure 10:
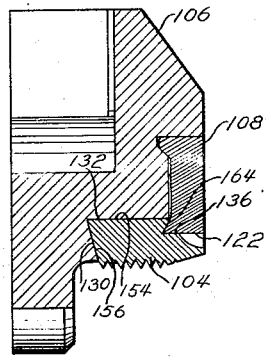
Figure 12:
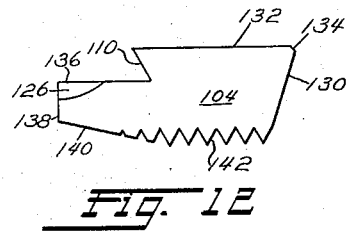
Figure 13:
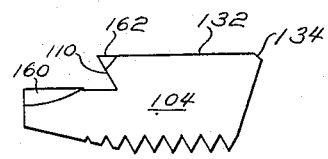
Figure 11:
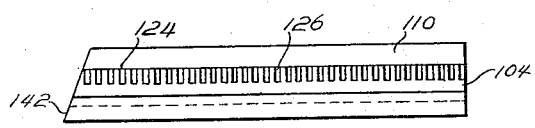
Figure 14:
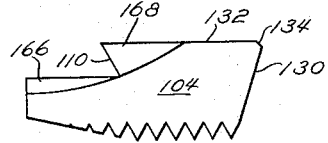
Figure 17:
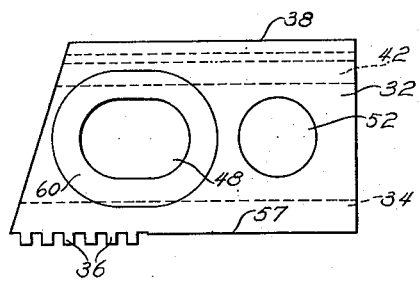
Figure 18:
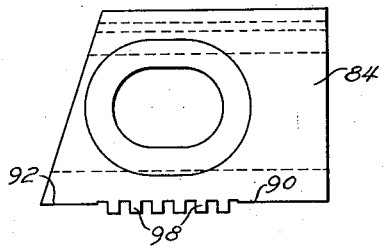
Figure 19:
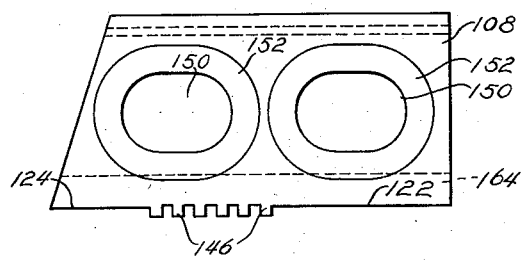
Figure 20:
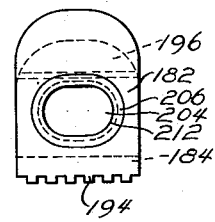

Figures 9 and 10 are sectional views of the chaser assembly shown in Figure 8 taken on lines 9—9 and 10—10, respectively;

Figure 11 is a side elevation of the chaser used in the assembly shown in Figure 8;

Figure 12 is an end elevation of the chaser shown in Figure 11;

Figures 13 and 14 are end elevations of other chasers having serrations formed like those on the chaser of Figure 12 but differing slightly therefrom;

Figure 15 is a plan view of still another type of chaser assembly embodying our invention;

Figure 16 is a sectional view of this last mentioned type of chaser assembly taken on the line 16—16 of Figure 15;

Figure 17 is an enlarged view of the chaser clamp of Figures 1 to 5;

Figure 18 is an enlarged view of the cheser clamp of Figure 7;

Figure 19 is an enlarged view of the chaser clamp of Figure 8;

Figure 20 is an enlarged view of the chaser clamp of Figures 15 and 16; and

Figure 21:
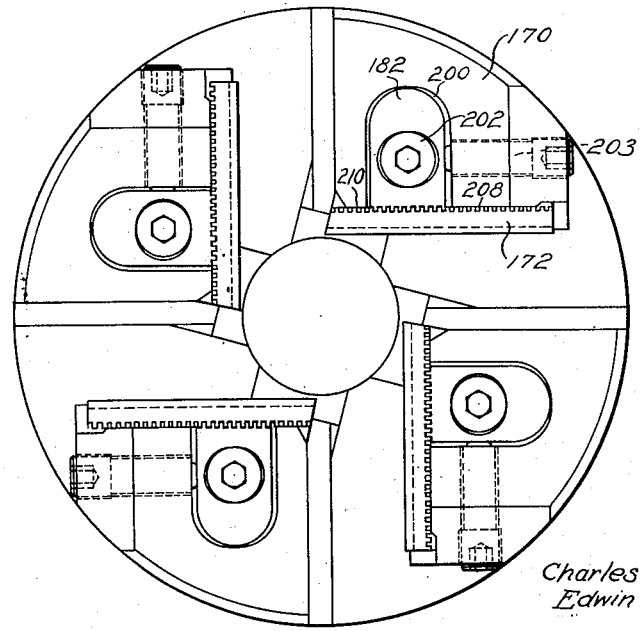
Figure 22:
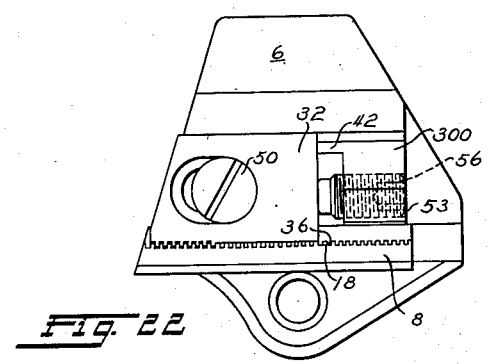
Figure 23:
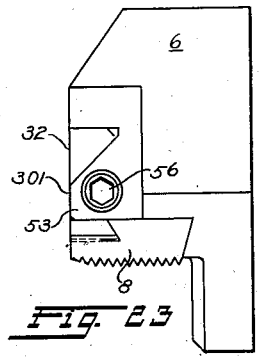
Figure 24:
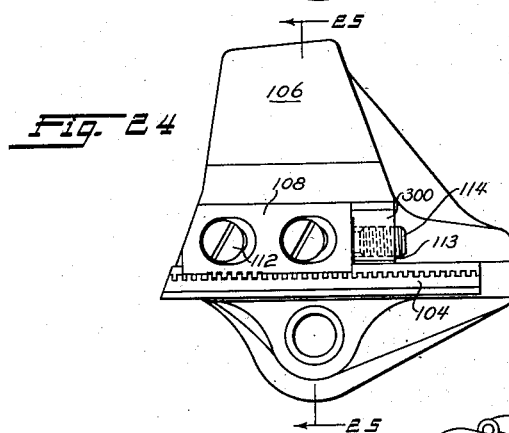
Figure 25:
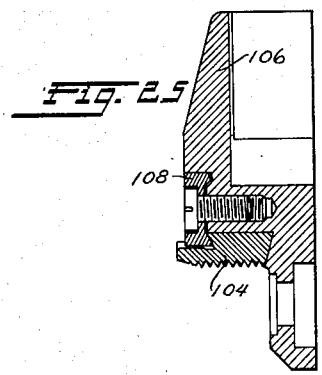

Figure 21 is a face view of a further type of die head provided with the improved chaser assembly of Figures 15 and 16;

Figure 22 is a plan view of a modified type of chaser assembly somewhat similar to that disclosed in Figure 1;

Figure 23 is an end view of the chaser assembly illustrated in Figure 22;

Figure 24 is a plan view of a modified type of chaser assembly somewhat similar to that disclosed in Figure 8;

Figure 25 is a sectional view taken along line 25—25 of Figure 24;

Figure 26 is a plan view of a further modified type of chaser assembly;

Figure 27 is an end view of the chaser assembly of Figure 26; and

Figure 28:
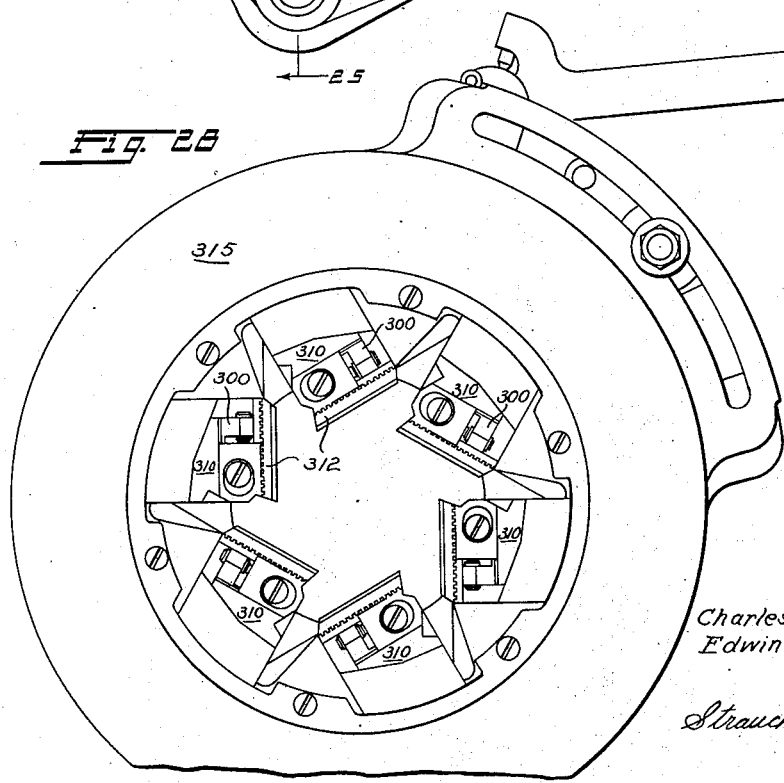

Figure 28 is a face view of a die head provided with the chaser assembly illustrated in Figures 26 and 27.

Referring now to the drawings and particularly to Figures 1 to 6 thereof, chaser holders 6 are mounted on head body 4 for actuation by closing ring 2 in the usual manner. Chasers 8 comprise a base seating surface 10, a back seating surface 12, a clamping surface 14, a recess 16, a serrated adjustment surface 18, a top surface 20, a thread-cutting throat 22, and a lead nut surface 24, see Figures 4 and 5. Also, a bevel 26 is formed between surfaces 10 and 12 so that any dirt which may be lodged on the seating surface of the chaser or holder will be forced behind this bevel and thus will not scar nor stress the chaser nor interfere with the proper seating of the chaser.

Chaser 8 is held in holder 6 with base seating surface 10 seated on holder surface 28 and with back seating surface 12 seated against holder surface 30. Clamp 32 has a clamping surface 34 which engages clamping surface 14 of chaser 8 and is also provided with serrations 36 which interfit with similar serrations 18 on the chaser.

Back seating surface 38 of clamp 32 bears against a seating surface 40 of holder 6 and inclined clamp surface 42 bears on holder surface 44. Clearances 46 and 47 are provided so that by tightening the clamp screw 50, threaded into holder 6 and passing through a clearance slot 48 in clamp 32, surface 34 of clamp 32 may be caused to firmly engage clamping surface 14 of chaser 8 and force surfaces 10—28 and 12—30 into engagement, and clamp surface 57 against the crests of serrations 18.

Clamp 32 carries an adjustment stud 52, flattened at 54 for engagement with an adjusting screw 56 which is threaded into lug 53 on holder 6. Stud 52 is received in a clearance slot 58, in holder 6, so that when clamp screw 50 is loosened, the clamp 32, and with it chaser 8, may be adjusted along the holder by turning screw 56. As will be pointed out later, screw 56 may be provided with a micrometer attachment thus making possible an exact determination of the amount of such adjustment.

Referring now to Figures 1 and 17, clamp 32 is formed with a seating surface 57, beyond the serrations 36. This surface engages the tops of crests of serrations 18 on chaser 8, thus giving added support to the thread-cutting throat portion 22 of the chaser. An elongated recess 60 in clamp 32 provides adjustment clearance for the head of clamp screw 50. Recess 60 and also slot 48 each have sufficient lateral clearance around screw 50 to insure perfect freedom of movement of the clamp 32 when screw 50 is being tightened so that there will be no binding of the parts.

Turning now to Figure 6, the preferred form of the adjustment serrations is shown at a greatly enlarged scale. The teeth 62 of clamp serrations 36 and teeth 64 of the chaser serrations 18 have their sides slightly inclined, or slanted, in order to facilitate the machining and fitting of these parts. However, if desired, these teeth may have perpendicular sides. Clearances 68 and 70, between adjacent crests and bottoms of the serrations 18 and 36, are provided, and, likewise, a slight lateral clearance 66, between adjacent teeth, is present. These clearances insure that the serrations will not perform any clamping function and thus will not interfere with the seating or clamping action of the unserrated clamping surfaces of the chaser 8 and clamp 32. Also, with this arrangement, there can be no binding of the parts, due to any indirect clamping action of the serrations or to a too tight fitting of these parts. It will be understood that this cross-sectional form of serration is provided on all of the chasers and clamps disclosed in the other several figures of the drawings although the smallness of the scale has made it impossible to show either the inclined sides or lateral clearances.

It will be readily observed from Figures 2 and 3 that the top surface 20 of chaser 8, the clamp 32, and clamp screw 50 are all flush with the front surface 72 of holder 6. Thus, there are no overhanging parts to interfere with the work piece. In order to give a slight inclination to chaser 8, the surface 28 may be inclined with respect to the back surface 74 of the holder 6. Also, the adjusting screw 56 is located entirely within the side face of holder 6, where it is out of the way and yet easily accessible when occasion demands.

Although the operation of our chaser assembly, or cutter-control element, should be apparent from the foregoing description, it is briefly as follows. With screw 50 loosened sufficiently, clamp 32 may be raised and chaser 8 slid along surface 28, with serrations 18 tipped outwardly away from serrations 36, until it is located approximately in the desired position. Then, screw 50 is tightened to bring serrations 18 and 36 into interlocking relation but not enough to clamp the chaser against movement. Now, fine adjustment of the chaser is made by means of screw 56, and finally screw 50 is tightened so as to force surfaces 10—28 and 12—30 into firm frictional engagement and to clamp surface 57 on the crests of serrations 18, see Figure 17. During adjustment by means of the screw 56 the clamp 32 is guided by holder surfaces 38 and 42 and thus cannot skew around. When thus clamped in place, chaser 8 is held firmly fixed, partially by the frictional engagement of the aforementioned surfaces and primarily by the adjusting screw 56, stud 52 and the abutting faces of serrations 18 and 36. Since the amount of movement of the adjusting screw, permitted by the slot 48, is greater than the distance between adjacent serrations, it is obvious that an infinite range of chaser adjustment is provided.

With this type of improved chaser assembly, the chaser is very firmly and rigidly held in adjusted position as has just been explained and, by virtue of the offset seating surface 57 on the clamp 32, see Figure 17, which engages the crests of chaser serrations 18, is given additional support. In fact, as can be seen from Figure 3, the chaser is supported throughout substantially its entire width. With the serrations of both the chaser and clamp arranged on non-clamping surfaces and provided with the clearances mentioned above, there can be no interference of the clamping action with the adjustment functions.

The improved adjustment feature obviates the direct abutment of an adjusting screw on the hardened chaser and avoids clogging of and damage to the adjusting screw threads by chips or dirt. This last objection is a very serious one in certain prior art chaser assemblies where the adjusting screw is exposed for a considerable part of its extent.

As will be readily observed, the improved adjustment arrangement permits the use of chasers varying widely in length, from the longest which the particular head will accommodate down to the shortest which can be supported in the holder. Thus a marked economy in tool cost is realized.

Also, with the improved chaser adjustment arrangement, a more rapid charge of chasers and a greater range of chaser adjustment is possible. Furthermore, when changing from chasers of one length to chasers of a different length, a very small movement of the adjusting screw is required. This is due to the fact that the adjusting screw is only needed for fine adjustment, major adjustment being effected through the adjustment serrations. Thus the operation of the device is very efficient from the standpoint of both time and labor.

In addition to the foregoing advantages the overall thickness of the assembly, as viewed in Figures 2 and 3, is kept at a minimum, which decreases the overhang of the chaser, thus providing a more rigid mounting, while the "flush" arrangement of the top of the chaser, the clamp, and clamping screw, with respect to the holder and throat of the chaser, makes it possible to cut threads very close to shoulders or other projections on a work-piece. Also, as has been noted above, the adjusting screw is out of the way of the operator and work but at the same time is readily accessible. A somewhat similar arrangement is disclosed in United States Patents Nos. 1,739,646 and 1,951,290, however, the improved arrangement allows the use of a longer chaser on existing heads without increasing their diameters.

In Figures 7 and 18 a slightly modified form of chaser assembly is shown which is, however, like the one just described with two exceptions. Chaser 80 is mounted in holder 82, as in the former case, by means of clamp 84, clamp screw 86, and chaser clamping surface 88. In this modification two offset seating surfaces 90 and 92 are provided on clamp 84, see Figure 18, one on each side of clamp serrations 98. These offset seating surfaces engage the crests or tops of chaser serrations 100. Adjusting screw 94 directly abuts the integral abutment face 96 on clamp 84 thereby eliminating the necessity for an adjusting stud such as stud 52 of Figures 2 and 3. Holder 82 has a lug 102 for carrying adjusting screw 94.

This form of chaser assembly operates in the same manner as the one first described and enjoys all of the advantages thereof. However, it has fewer parts and is easier to produce. Also, due to the provision of the two offset seating surfaces, this form provides an even better support for the chaser, especially adjacent to the working end thereof.

In Figures 8, 9, 10 and 19 another modified type of chaser assembly is shown which is, in general, similar to the two that have just been described. In this form of chaser assembly, chaser 104 is mounted on holder 106, in the same manner as before, and is held in place by clamp 108, see Figure 19, engaging chaser clamping surface 110. Two clamp screws 112 are provided and an adjusting screw 114, threaded into lug 113, cooperates directly with an integral abutment face 116 on clamp 108. A locking sleeve 118 is threaded on screw 114 for locking engagement with a surface 120 on holder 106 in a manner which will be readily understood.

Locking ring 118 is also provided with suitable indicia on its outer peripheral surface so that it may be used as a micrometer adjusting device. In conventional chaser assemblies a setting gauge is commonly used to set the chasers to maintain their tangential relationship to the work after a diametrical adjustment has been made. This gauge may take the form shown at 107, in Figure 8, and will have a suitable vernier scale indicia 109 thereon to register with corresponding indicia 111 on the holder 106. In setting the chaser the gauge is contacted with the cutting edge, as shown, and by moving the chaser and clamp the proper scale marks are made to coincide. The ring 118 is now turned so as to abut surface 120, and, thus, the adjusting screw 114 is locked against accidental turning.

Now, if it is desired to advance or retract the chasers beyond the gauge setting by a certain amount, the locking ring 118 is made to abut the head of screw 114. Then screw 114 is turned and by properly registering the indicia on ring 118, either with a fixed part of the holder 106, or with the zero mark thereon, the desired movement of screw 114 may be effected. The locking ring is now again turned on screw 114 to bring it in locking engagement with surface 120 and with clamp 108 held in abutting relation with screw 114. The clamp screws 112 are tightened, thus holding chaser 104 in the desired position. If the locking feature of ring 118 is not required, this ring may be dispensed with and the indicia placed directly on screw 114.

In this form of chaser assembly, clamp 108 is provided with two seating surfaces 122 and 124, one on each side of its serrated portion 146, see Figure 19. Surfaces 122 and 124 engage the crests of chaser serrations 126. Thus, two offset seating surfaces, for giving additional support to the chaser, are provided, the same as in the assembly shown in Figure 7.

Although chaser 104 may be provided with adjustment serrations exactly like those of the previously described chasers, a slightly modified kind of serration is shown. These serrations have the same cross-sectional outline as those shown in Figure 6 but, instead of having bottoms which are parallel to their tops or crests, consist of arcuate grooves, see Figure 12. This type of serration is easier to machine than the parallel type and simplifies the manufacture of the chaser considerably as no raised surface, as at 18 in Figure 5, need be provided.

This type of chaser has a clamping surface 110, a base seating surface 130, a back seating surface 132, a bevel 134, an offset seating surface 136, a top surface 138, a thread-cutting throat surface 140, and a lead nut surface 142. When assembled in holder 106, see Figures 9 and 10, surfaces 130—156, 132—154 and 136—122, 124 are firmly pressed together by clamp 108 engaging surface 110 in the same manner as in the case of the assembly shown in Figures 2 and 3. As can be readily seen from Figure 10, with this type of serration a considerably larger offset seating surface 136 is provided for engagement with the seating surfaces 122 and 124 of the clamp 108.

This form of assembly operates like the others and with serrations 146 of the clamp engaged with chaser serrations 126, so as to approximately position the chaser, fine adjustment of the chaser is effected through adjusting screw 114, the clearance slots 150 and recesses 152 permitting movement of the clamp 108. After adjusting movement, screws 112 are tightened to clamp the chaser in place.

As in the other forms, the serrations are provided with both top and bottom as well as lateral clearances so that the adjustment action cannot interfere with the clamping action and these adjustment serrations are arranged on non-clamping surfaces. In addition to the mentioned clearances, a clearance 148 is provided adjacent to the clamp serrations 146, between clamp 108 and seating surface 136 of the chaser 104, see Figure 9. Also, the clamp screw, clamp, and top surface of the chaser are flush with the front of the holder to obviate excessive overhang and interference with the work-piece.

If desired, the kind of serrations shown in this form of our invention may be extended further in the chaser as shown at 160 and 162 of Figure 13 or at 166 and 168 of Figure 14. When this is done, matching serrations may be provided on the clamping surface 164 of clamp 108 thus giving additional adjustment surfaces on both the clamp and chaser.

In Figures 15 and 16 another modified form of chaser assembly is shown which is essentially like the others which have been already described, especially the form shown in Figure 7, but in which the clamp, see Figure 20, has no seating surfaces. In this form, holder 170 is of slightly different design from those previously discussed and is intended to be mounted for radial sliding movement in the die head illustrated in Figure 21.

Chaser 172 has a base seating surface 174 and a back seating surface 176 held in frictional engagement with seating surfaces 178 and 180 of the holder 170 by means of clamp 182. This clamp is of the so-called "angular" type disclosed in United States Patent No. 1,951,290 and has a clamping surface 184 which cooperates with a clamping surface 186 on chaser 172. A bevel 188 is provided between chaser surfaces 176 and 174.

Chaser 172 is formed with serrations 190 and between these serrations and clamping surface 186 is a recess 192 which makes it possible to readily machine the serrations. As will be readily understood, the arcuate type of serrations, shown in Figures 12 to 14, may be used if desired. Clamp 182 has matching serrations 194 and an inclined seating surface 196 which bears on a holder surface 198. Clearance 200 is provided between clamp 182 and holder 170 so that clamp 182 may be adjusted, with chaser 172, by means of an adjustment screw 203. A slot 204 and recess 206 are likewise formed in the clamp for the same reason.

Holder 170 has formed thereon two seating surfaces 208 and 210 which bear against the crests of chaser serrations 190 to give added support to the chaser. Serrations 190 and 194 have the clearances shown in Figure 6, and as no offset seating surfaces are provided on clamp 182, for supporting the chaser, the clamp operates only to apply the clamping force of screw 202 to surface 186 of the chaser, and to prevent longitudinal motion of the chaser after adjustment.

The clamp is cut away at 212 and also relieved at 214 so that it bears on the holder only at surface 196, as shown. Thus, the force applied by screw 202 is all resolved into a clamping force on surface 186. A snap ring 216, carried by clamp screw 202, raises clamp 182 when screw 202 is loosened. In this type of chaser assembly, i. e., with the angular clamp, a more efficient application of the clamping force may be realized if the chaser surfaces 174 and 186 are equally inclined with respect to the back seating surface 176 and the holder surface 198 arranged parallel to holder surface 180. With this arrangement of clamping and seating surfaces the resultant force acting on the chaser is normal to and acts in the center of the chaser back seating surface. This feature is more completely described and claimed in the copending application of Mr. Charles A. Reimschissel, Serial No. 151,913, filed July 3, 1937, now U. S. Patent No. 2,152,567, granted March 28, 1939. This principle may likewise be embodied in the chasers used with the clamps of the assemblies shown in Figures 1 to 14, 22 to 24, 27 and 28 by inclining the chaser base seating surfaces and clamping surfaces equally with respect to their back seating surfaces. As the clamps 32, 84, and 108 of these assemblies abut the holder on their back surfaces, it is not essential that the clamp seating and clamping surfaces be equally inclined, or that the holder seating surfaces be parallel to each other.

The operation of this last type of chaser assembly is, of course, the same as those previously described and this form of our invention enjoys all of the advantages of the others.

Figures 22, 23, 24 and 25 illustrate chaser assemblies similar to those shown in Figures 1, 8 and 9, in which the holder has been slightly modified so that the lug for the adjusting screw, see 53 of Figure 1 and 113 of Figure 8, does not interfere with the machining of the clamp seating surfaces of the holder. Figure 22 corresponds to Figure 1, while Figures 24 and 25 correspond to Figures 8 and 9. This modified type of adjusting screw lug, shown at 53 and 113 in these figures, is formed so that the chaser clamp seating surface 300 thereof is extended to the top surface 301 of the lug; whereas, in the designs of Figures 1, 8 and 9, the corresponding surfaces were made with two separate inclinations, one 44 of Figure 1 and 115 of Figure 8, extending as in the present manner and the other being perpendicular to the base of the holder. Thus, this modified type of adjusting screw lug permits the use of a relatively wide cutter and thereby decreases the difficulty of machining the holder surfaces 300.

Figures 26 and 27 show views of a chaser assembly similar to that illustrated in Figures 22 and 23 but being based on the type of holder disclosed in the United States Patent No. 1,739,646 to Samuel F. Newman. The holder 310 of this assembly is used in conjunction with a die head 315, as is shown in Figure 28. Chaser 312 is held in place by clamp 314, and, as in the other holder assemblies, an adjusting screw 316 is provided. Die heads of this type are not new in the art, therefore, no detailed explanation of the construction of the head is deemed necessary.

From the foregoing it will be apparent that we have provided several forms of improved and novel chaser assemblies, or cutter-control elements. These several forms, while differing in certain particulars, such as the nature of the adjustment serrations, the types of adjustment screws and clamps, and the arrangement of the chaser and clamp offset seating surfaces, all embody the same novel features. In all of these an unusually rigid and firm support for the chaser is provided, and, at the same time, easy and rapid adjustment or change of the chasers may be effected. Furthermore, in all the forms, the adjustment serrations are on non-clamping surfaces and are provided with clearances so that there can be no interference between clamping and adjustment actions. Likewise, in all the forms the overall width of the chaser assembly, from front to back, is maintained at a minimum value thus preventing undesirable "overhang" or interference with the work-piece.

The chasers shown in the several figures of the drawings and described above are all of the type wherein the thread-cutting serrations are parallel to the base and also to the longitudinal axis of the chaser and the helix angle is provided in the holder. However, it should be understood that the present invention may be used with chasers of the type which have their thread-cutting serrations arranged at an angle to their longitudinal axes. Examples of such use are shown in our co-pending application, Serial No. 249,324 of even date herewith, and which is concerned with certain improvements in chaser assemblies of this general type.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A chaser assembly for use in thread-cutting machines, comprising; a chaser holder having chaser seating surfaces and a clamp seating surface thereon; a chaser mounted on said holder and having seating surfaces coacting with said chaser seating surfaces of said holder, a clamping surface, and a forwardly projecting portion; a chaser clamp adjustably mounted on said clamp seating surface and having a clamping surface engaging said chaser clamping surface; interfitting means on said clamp and said forwardly projecting portion of said chaser; a chaser seating surface on said clamp adapted to engage portions of said chaser interfitting means and support said forwardly projecting portion of said chaser when said chaser is clamped to said holder by said clamp.

2. In a chaser assembly, the combination set forth in claim 1, wherein said interfitting means on said clamp and said chaser comprise matched tooth elements having clearances therebetween.

3. In a chaser assembly, a holder having chaser seating surfaces and a clamp surface thereon; a chaser seated on said seating surfaces; a clamp for clamping said chaser on said holder; matched serrations on said clamp and said chaser, said serrations being separate from clamping portions of said clamp and said chaser and provided with appreciable clearances.

4. In a chaser assembly, the combination set forth in claim 3, wherein said chaser serrations provide an offset seating surface on said chaser.

5. In a chaser assembly, a holder having a front and a back face, chaser seating surfaces on said holder, a clamp seating surface on said holder offset inwardly from said front face; a chaser mounted on said chaser seating surfaces and having a clamping surface, a forwardly projecting portion on said chaser extending beyond said clamping surface; a clamp seated on said clamp seating surface and having a surface engaging said chaser clamping surface; interfitting teeth on said clamp and said chaser projecting portion; a clamping screw associated with said clamp for forcing said clamp against said chaser; said clamp, clamping screw and the projecting portion of said chaser being substantially flush with said front face of said holder when said clamping screw is tightened against said clamp.

6. In a chaser assembly, a holder having a front face, chaser seating surfaces, and a clamp seating surface offset from said front face; a chaser mounted on said seating surfaces, said chaser having a clamping surface and an offset serrated portion adjacent to said clamping surface but separate therefrom; a clamp adjustably mounted on said clamp seating surface and having a clamping surface engaging said chaser clamping surface, a portion of said clamp being provided with serrations cooperating with said offset serrated portion of said chaser to interlock said clamp and said chaser; threaded means associated with said holder for adjusting said clamp, together with said chaser, along said holder; and means for binding said clamp against said holder and chaser for holding said chaser in adjusted position.

7. A chaser assembly comprising, a holder, a chaser seated on said holder, a clamp for clamping said chaser to said holder, interfitting serrations on said chaser and said clamp for coupling said chaser to said clamp; guiding and seating surfaces on said holder for said clamp; means for moving said clamp on said holder, said means comprising a threaded member disposed substantially parallel to the direction of movement of said clamp on said holder, said threaded member being received by a portion of said holder spaced inwardly from its outer surface, and being of such length that it does not project beyond said holder.

8. A chaser assembly comprising, a holder having a recess in its front face; a chaser mounted on said holder; a clamp received in said recess and engaging said chaser; interfitting means on surfaces other than clamping surfaces of said clamp and said chaser, for coupling said chaser to said clamp; means for moving said clamp along said recess to adjustably position said chaser on said holder; said recess having surfaces arranged to guide said clamp during said movement.

9. A chaser assembly comprising, a holder having a front face, chaser seating surfaces, and a clamp seating surface offset from said front face; a chaser mounted on said chaser seating surfaces; a clamp having a seating surface bearing on said clamp seating surface and engaging a portion of said chaser; mutually engaging projections on said chaser and said clamp for coupling said chaser to said clamp at any one of a plurality of positions; said projections being adjacent to but independent of the portion of said chaser engaged by said clamp; an elongated recess in said holder under said clamp; an abutment member on said clamp extending into said recess; means threaded to said holder and cooperating with said abutment for adjusting said clamp, together with said chaser, along said holder; and means for clamping said clamp against said holder and chaser to thereby hold said chaser in adjusted position.

10. In a chaser assembly, the combination set forth in claim 9, wherein said clamp is provided with a supporting surface for engaging certain of said chaser projections when said chaser is held in adjusted position by said clamp.

11. A chaser assembly comprising, a holder having a front face, chaser seating surfaces, and a clamp seating surface offset from said front face; a chaser mounted on said chaser seating surfaces; a clamp having a seating surface bearing on said clamp seating surface and engaging a portion of said chaser; mutually engaging projections on said clamp and chaser for coupling said chaser to said clamp at any one of a plurality of positions; said projections being adjacent to but independent of the portion of said chaser engaged by said clamp; an adjusting member threaded to said holder and cooperating with said clamp for adjusting said clamp, together with said chaser, along said holder; and means for clamping said clamp against said chaser and holder to thereby hold said chaser in adjusted position.

12. In a chaser assembly, the combination set forth in claim 11, wherein said clamp is provided with spaced supporting surfaces for engaging certain of said chaser projections when said chaser is held in adjusted position by said clamp.

13. In a chaser assembly, the combination set forth in claim 11, wherein said adjusting member is provided with a locking member carrying indicia for indicating the amount of chaser adjustment.

14. In a chaser assembly, the combination set forth in claim 11, wherein said adjusting member is provided with indicia means for indicating the amount of chaser adjustment, said indicia means being operable to indicate increments of chaser adjustment over a range at least as great as the pitch of said projections on said clamp and chaser.

15. A chaser assembly comprising, a holder having chaser seating surfaces, and a front face, a recess in said front face having a bottom surface providing a clamp seating surface; a chaser mounted on said chaser seating surfaces and having a clamping surface; a clamp received in said recess and movable along said clamp seating surface, said clamp having a portion engaging said chaser clamping surface; a separate serrated portion on said clamp and a complemental separate serrated portion on said chaser for engaging said clamp serrations to couple said chaser to said clamp; and adjusting means carried by said holder for moving said clamp, together with said chaser, along said holder; and means for clamping said clamp against said holder and chaser to thereby hold said chaser in adjusted position.

16. In a chaser assembly, the combination set forth in claim 15, wherein said holder is provided with spaced chaser supporting surfaces, adjacent said recess, for engaging certain of said chaser projections when said chaser is held in adjusted position by said clamp.

17. A chaser having a thread-cutting face, a base, a back-seating surface, a clamping surface and an offset seating surface, said offset seating surface being provided with serrations.

18. A chaser having a thread-cutting face, a bevelled base, a back seating surface, a clamping surface and an offset seating surface, said offset seating surface being in back of a portion of said thread-cutting face and provided with a multiplicity of serrations having slant sides.

19. A chaser having a thread-cutting face, a bevelled base, a back seating surface, a clamping surface, a recessed portion and an offset seating surface, said offset seating surface being traversed by a plurality of grooves of uniform depth extending to said recessed portion.

20. A chaser as set forth in claim 19, wherein said grooves have slant sides.

21. A chaser having a thread-cutting face, a bevelled base, a back seating surface, a clamping surface and an offset seating surface, said offset seating surface being traversed by a plurality of grooves, said grooves being of uniform section but varying in depth.

22. A chaser having a thread-cutting face, a bevelled base, a back seating surface, a clamping surface and an offset seating surface, said offset seating surface being traversed by a plurality of grooves, said grooves being of uniform section but varying in depth and extending into said clamping surface.

23. In a chaser assembly, a holder, a chaser and a clamp for clamping said chaser to said holder; mutually engaging clamping surfaces on said clamp and said chaser, and interfitting projections on said clamp and chaser, said projections being on portions of said chaser and clamp separate from said mutually engaging clamping surfaces.

24. In a chaser assembly, a holder, a chaser and a clamp for clamping said chaser to said holder; mutually engaging clamping surfaces on said chaser and holder, and matching serrations on said chaser and clamp for coupling said chaser to said clamp at any one of a plurality of positions; said serrations being separate from said clamping surfaces and having slant sides.

25. In a chaser assembly, a holder, a chaser and a clamp for clamping said chaser to said holder; mutually engaging clamping surfaces on said clamp and said chaser, and matching serrations on said chaser and said clamp for coupling said chaser to said clamp at any one of a plurality of positions; said serrations being separate from said clamping surfaces and fitting loosely to provide clearances, whereby said coupling action will not interfere with the clamping of said chaser to said holder.

26. In a chaser assembly, a holder, a chaser and a clamp for clamping said chaser to said holder; mutually engaging clamping surfaces on said chaser and said clamp; a projecting portion on said chaser extending beyond said chaser clamping surface; serrations on said projecting portion and matching serrations on said clamp; means on said clamp, adjacent to said clamp serrations, for engaging the crests of said chaser serrations to support said chaser adjacent to said projecting portion.

27. In a chaser assembly, a holder, a chaser and a clamp for clamping said chaser to said holder; mutually engaging clamping surfaces on said chaser and clamp; a plurality of serrations on said clamp and spaced seating surfaces on said clamp at each side of said serrations; said chaser having a portion extending beyond said clamping surfaces, said portion being provided with serrations matching said clamp serrations and seating surfaces matching said spaced surfaces on said clamp.

28. A chaser having a thread-cutting face, a base, a back-seating surface, a clamping surface and an offset seating surface, said offset seating surface being in back of said thread-cutting face and provided with serrations.

29. A chaser having a thread-cutting face, a bevelled base, a back-seating surface, and a clamping surface, said chaser also having a portion in back of said thread-cutting face provided with a multiplicity of serrations the tops of which provide an offset seating surface.

30. A thread-cutting and die-head control assembly comprising a holder having a front face, chaser seating surfaces, and a clamp seating surface, a chaser mounted on said chaser seating surfaces, a clamp on said holder and engaging said chaser, mutually engaging projections on said clamp and chaser for coupling said chaser to said clamp at any one of a plurality of positions, said projections on said chaser being formed to provide a chaser offset seating surface, and means engaging and supporting said surface when said chaser is clamped to said holder.

31. The assembly as set forth in claim 30, wherein said last named means comprises supporting surfaces on said clamp.

32. The assembly as set forth in claim 30, wherein said last named means comprises supporting surfaces on said holder.

CHARLES A. REIMSCHISSEL.
EDWIN M. EIGENBRODE.